July 28, 1959  R. W. SWORDS  2,896,308
APPARATUS FOR BORING AND FACING WORK PIECES
Filed March 23, 1954  8 Sheets-Sheet 5

July 28, 1959

R. W. SWORDS

2,896,308

APPARATUS FOR BORING AND FACING WORK PIECES

Filed March 23, 1954

INVENTOR.
Robert W. Swords
BY
Olson & Trexler
attys.

United States Patent Office 2,896,308
Patented July 28, 1959

2,896,308

APPARATUS FOR BORING AND FACING WORK PIECES

Robert W. Swords, Rockford, Ill.

Application March 23, 1954, Serial No. 418,009

15 Claims. (Cl. 29—26)

The present invention relates to a novel apparatus for boring and facing a work piece and, more particularly, to a novel apparatus especially adapted for facing a valve seat and boring a concentric valve stem guide in work pieces such as internal combustion engine cylinder heads.

One form of apparatus heretofore provided for finishing valve seats and valve stem guide apertures in a work piece, such as a cylinder head, has included an elongated boring or gun drilling tool and a facing tool located adjacent the inner or supported end of the boring tool. Thus, as a rotating head carrying these two tools is advanced toward a work piece, the boring tool first functions to finish the guide aperture and then the facing tool engages and finishes the valve seat. While at first glance it would appear that such an arrangement of the tools would provide the work piece with perfectly concentric valve seat and valve stem guide surfaces, it has been found that the elongated boring tool when rotated at a high speed tends to whip or vibrate back and forth, whereby the valve stem guide aperture is eccentrically formed with respect to the valve seat and distorted in cross sectional configuration.

To test for concentricity, a plug the size of a valve stem is mounted in the hole, and the stem of a dial indicator gauge mounted on the end of the plug is moved over the valve seat surface by rotating the plug and gauge. The movement of the dial indicator then indicates the eccentricity.

The use of machinery heretofore known resulted in a gauge reading of anywhere from, say, 0.0010 inch to 0.0080 inch and the error was not repeated. The first workpiece, i.e., might give a reading of 0.0030 inch; the second 0.0010 inch; the third, 0.0080 inch, etc. Furthermore, the guide holes were out of round, tapered and rough and had to be finish reamed, and even on the workpieces which gave a reading of 0.0010 inch after boring, it was impossible to get a reading of less than 0.0030 inch after finish reaming. In addition, the valve seats had to be hand lapped. Six men were required for doing the hand lapping of the seats, after which the workpieces were checked, and in addition, two other men hand lapped more when the check showed it to be necessary. This means that for each three men running a progress through machine, there were six other men doing hand lapping of the valve seats.

With the apparatus of the present invention, the holes are accurately and smoothly formed so that the finish reaming operation is eliminated in the progress through machine, saving time and floorspace. In addition, the hand lapping of the valve seats is eliminated, representing a saving of 66% in labor costs and elimination of the "human error" element. The gauge readings on workpieces machined with the apparatus have a maximum of 0.0010 inch, and a minimum of 0.0000 inch, the latter reading indicating that the hole and seat are concentric. Most readings fall about half-way within this range.

Car manufacturers specify a certain tolerance of eccentricity, for example 0.0020 or 0.0030 inch. But previous to applicant's invention they were never able to get within their specified tolerance. With applicant's device, however, at last reports, 17,000 workpieces representing 136,000 holes and seats have passed through an air check gauge set at 0.0020 inch, without a single rejection. In view of these results, it is now contemplated that only spot checking of the workpieces will be used in the future, thereby permitting a substantial saving in "inspection costs."

A primary object of the present invention is to provide a novel apparatus for finishing a surface of a bore and a surrounding surface on a work piece so that the surfaces are more nearly concentric than it has ever been possible to make them before.

Another object of the present invention is to provide a novel apparatus for automatically and rapidly forming a valve stem guide and a valve seat in a work piece so that they are more nearly concentric than ever before.

Another object of the present invention is to provide a novel apparatus of the above described type which is rugged and relatively simple and economical to manufacture and maintain.

A more specific object of the present invention is to provide a novel spindle head carrying a boring tool and a facing tool, which spindle head is constructed so that the surfaces formed by said tools will be more nearly concentric than heretofore possible with production machinery.

A still further object of the present invention is to provide a novel spindle head of the above described type wherein an elongated boring or drilling tool is restrained against any whipping action, whereby to form the bore and seat more nearly concentric and to minimize or eliminate distortion in the cross sectional shape of the bore.

Another object of the present invention is to provide a novel apparatus of the above described type whereby the boring and facing operations may be carried out independently with the facing tool disengaged from the work piece when the boring tool is functioning and vice versa.

Other objects and advantages of the present invention will become apparent from the following description and accompanying drawings wherein:

Fig. 12 is an enlarged fragmentary cross-sectional view taken along line 12—12 in Fig. 1;

Figure 1:
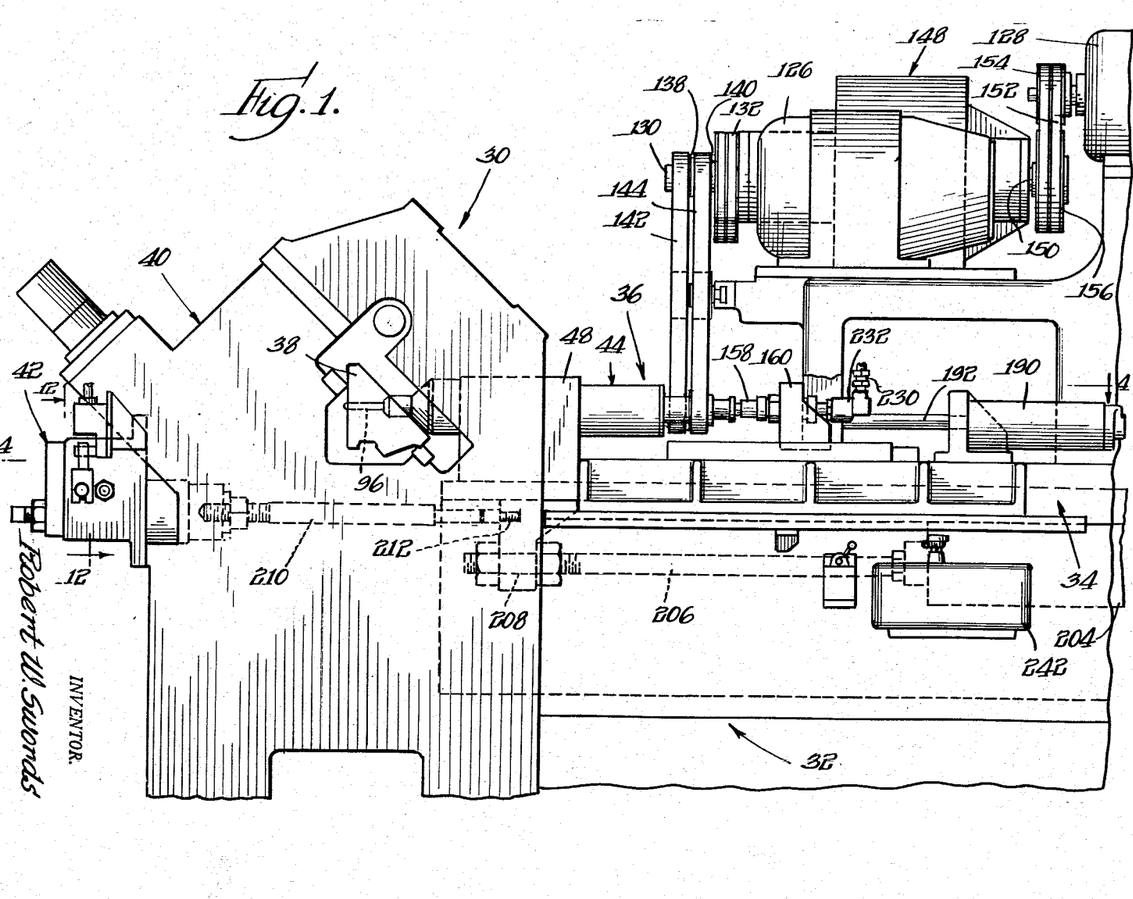
Fig. 1 is a fragmentary side elevational view of an apparatus embodying the principles of this invention.
Figure 2:
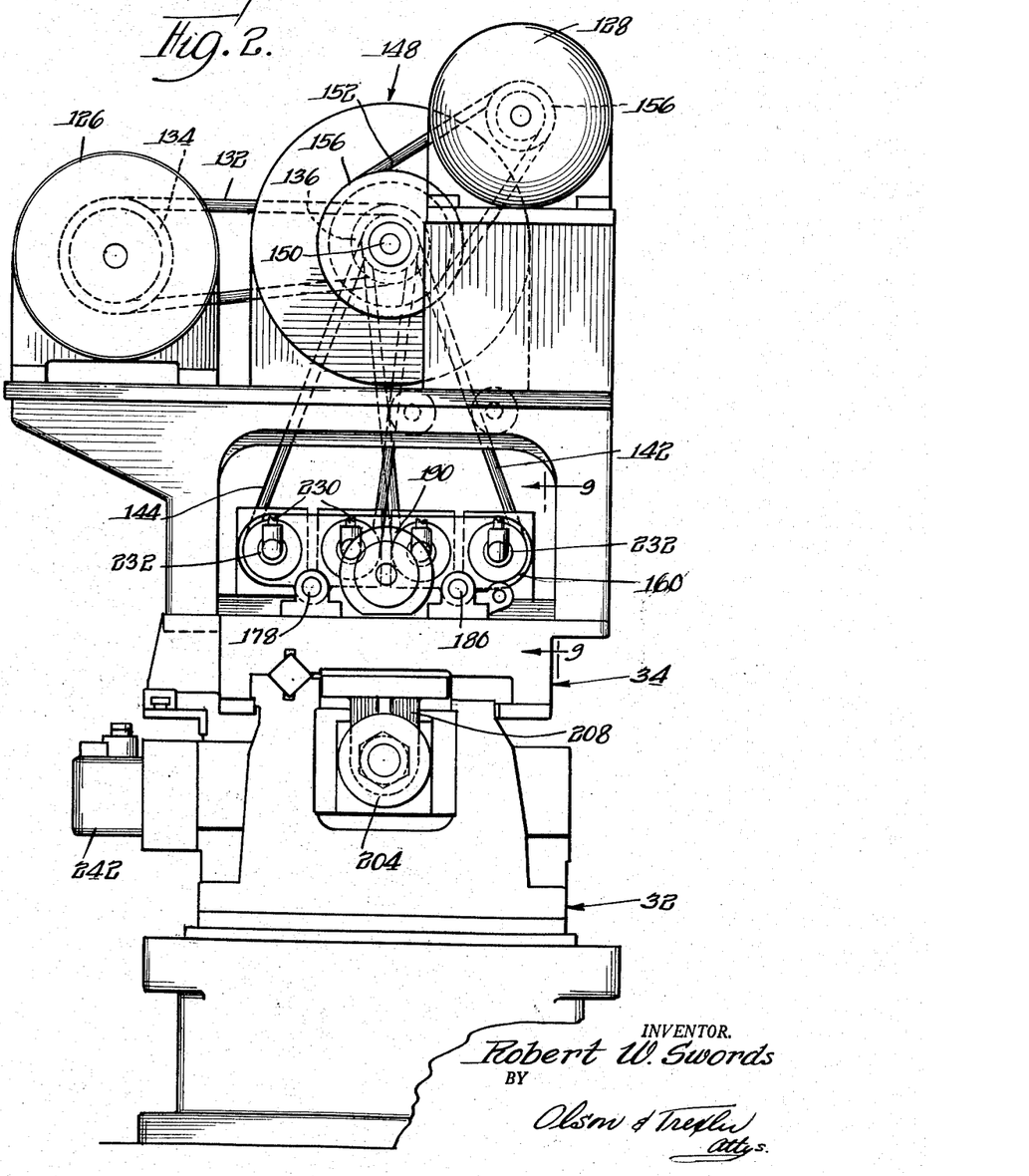
Fig. 2 is a right hand end elevational view of the apparatus shown in Fig. 1.

Referring now more specifically to the drawings wherein like parts are designated by the same numerals throughout the various figures, an apparatus 30 embodying the features of the present invention is shown best in Figs. 1 and 2. In general, this apparatus includes a base 32 having a saddle or carriage 34 slidably disposed thereon. The saddle carries boring and facing means 36 for finishing a valve seat and valve stem guide in a work piece 38, such as an engine cylinder head. The work piece is supported in any suitable fixture 40 and adjustable stop means 42 is mounted on the frame of the fixture for the purpose described fully hereinbelow.

Figures 5, 6, 7, 8:
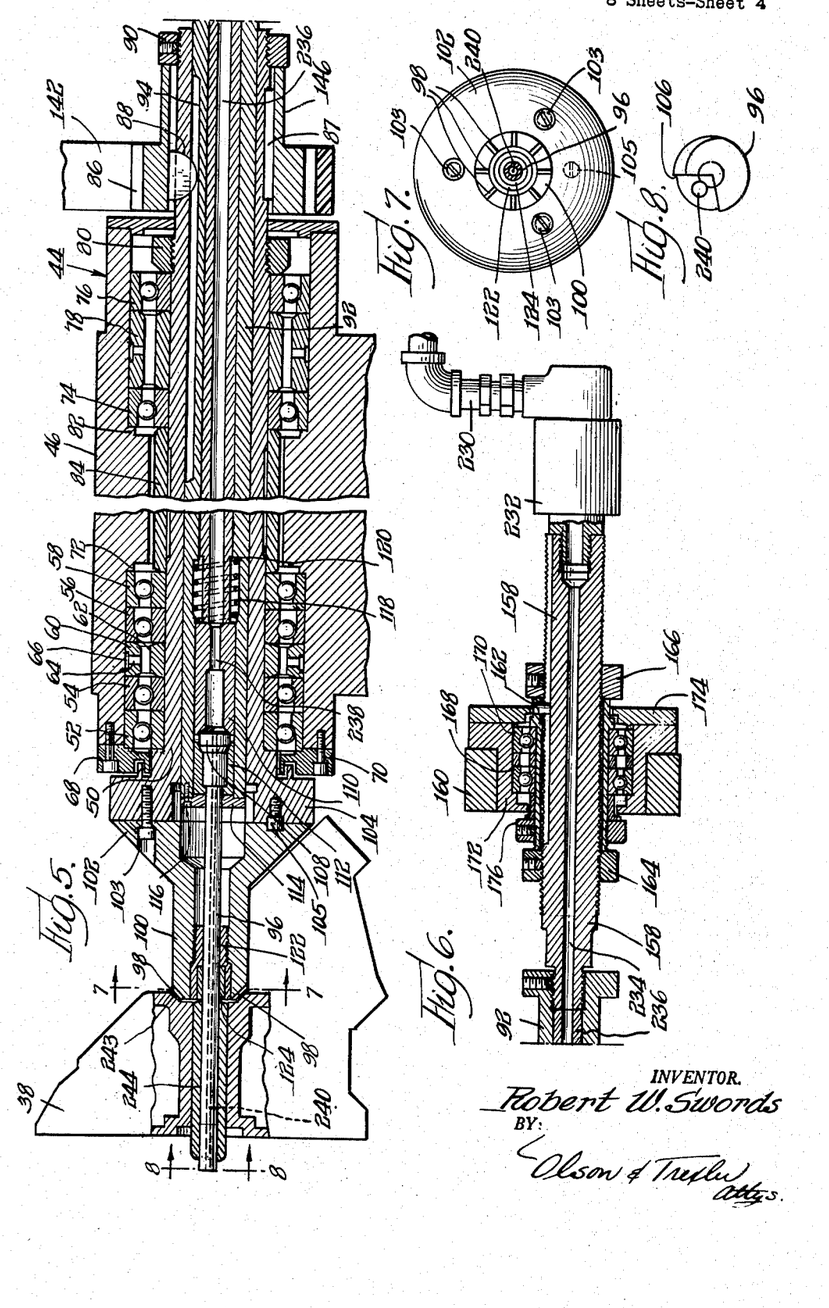
Fig. 5 is an enlarged fragmentary cross-sectional view taken along line 5—5 in Fig. 4.
Fig. 6 is a continuation of Fig. 5.
Fig. 7 is a cross-sectional view taken along line 7—7 in Fig. 5.
Fig. 8 is an end view taken along line 8—8 in Fig. 5.
Figure 9:
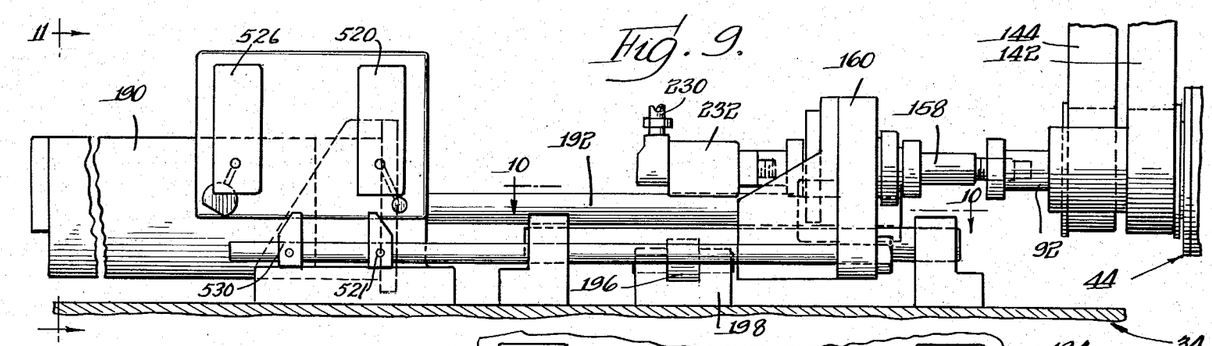
Fig. 9 is an enlarged fragmentary elevational view taken along line 9—9 in Fig. 2.
Figure 10:
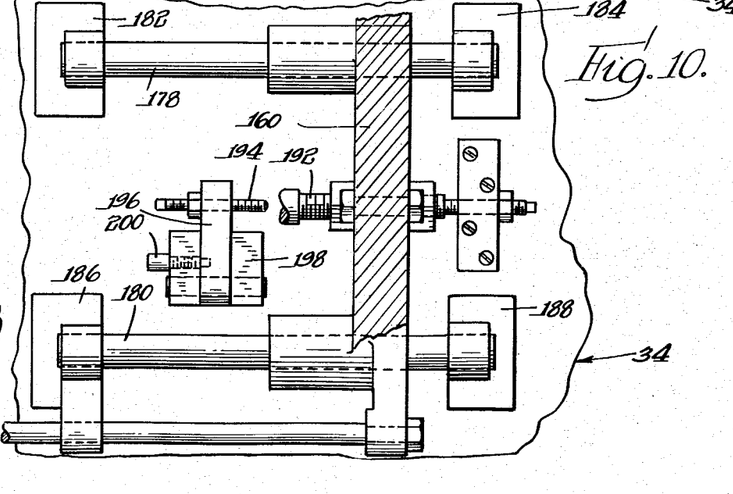
Fig. 10 is a fragmentary cross-sectional view taken along line 10—10 in Fig. 9.

The boring and facing means 36 includes one or more spindle heads 44. The apparatus shown for the purpose of illustrating the present invention includes four of these spindle heads and it should be understood that the particular number of spindle heads used in the given apparatus may be varied as desired. Referring particularly to Fig. 5, it is seen that each spindle head 44 includes a housing 46 which is adapted to be fixed on the saddle or carriage 34 by suitable means such as a mounting block 48 (see Fig. 1). A hollow shaft 50 is rotatably disposed within the housing 46. Adjacent the forward end of the housing, the hollow shaft is supported by a plurality of ball bearing assemblies 52, 54, 56 and 58. A ring 60 is disposed between the bearing assemblies 54 and 56 and is provided with axially extending apertures 62 for directing lubricating oil to the bearings. The axially extending apertures 62 communicate through a radial aperture 64 with an opening 66 in the housing, which opening is adapted to receive an oil conduit connected to a suitable source of lubricating oil, not shown. The bearing assemblies are confined against movement in one direction by means of a ring 68 secured to the end of the housing by a plurality of screws 70. The housing is provided with an internal shoulder 72 for restraining the bearing assemblies against axial movement in the opposite direction. The rear end of the hollow shaft is rotatably supported by bearing assemblies 74 and 76, which assemblies are spaced by ring 78 similar to the above described ring 60. A nut member 80 is threaded onto the shaft for retaining the bearing assembly 76 against rearward axial movement and a shoulder 82 on the housing along with a spacing sleeve 84 is provided for retaining the bearing assembly 74 in the proper axial position.

In order to rotate the hollow shaft 50, a pulley 86 is fixed thereto by means of a key 87 and a nut member 90. The pulley is preferably driven by a cog or timing belt, as set forth hereinbelow and is, therefore, provided with teeth adapted to mesh with the timing belt. Another hollow shaft 92 is disposed within the shaft 50 and the two shafts are connected together for rotation in unison by a key 88. However, it should be noted that the shaft 92 is provided with an elongated keyway 94 so that the shaft 92 may be reciprocated relative to the shaft 50.

In accordance with the present invention, the spindle head is adapted to carry a boring tool 96 and a valve facing tool 98. In the embodiment illustrated in Fig. 5, a plurality of valve facing tools or cutting edges 98 may be annularly spaced about a hollow tip portion 100 of a cap or head 102. The head 102 is secured to an end flange 104 of the hollow shaft 50 by means of a plurality of screws 103 and a dowel screw 105. The boring tool 96 may be of various known types having an elongated shank with a cutting edge 106 provided at the outer or free end of the shank. In accordance with the present invention, a collet 108 is provided in association with the inner end of the boring tool, which collet 108 is adapted to be gripped between cooperating chuck members 110 and 112 disposed within the hollow shaft 92. The chuck member 112 is retained within the hollow shaft by means of a cap 114 secured in position by screws 116 and the chuck 110 is forced against the collet 108 by means of a conduit 236 which may be tightened and relieved by threading shaft 158 (Fig. 6) into and out of the shaft 92. A compression spring 118 disposed between the chuck member 110 and shoulder means 120 provided on the shaft 92 for resiliently locating the chuck member 100 in the desired position when the clamping force provided by the conduit 236 has been relieved.

From the structure described in the preceding paragraph, it is seen that the boring tool and the facing tool will be rotated in unison and that the boring tool may be reciprocated relative to the facing tool. In accordance with an important feature of the present invention, the hollow shaft 92 and the boring tool are constructed so that the boring tool may be moved from the extended position illustrated in Fig. 5 to a retracted position within the shaft 50 and the head member 102. The boring tool is supported for sliding movement and to restrain any possibility of whipping motion or radial vibration by means of a bushing 122 disposed within the tip 100 of the head member 102 and, if desired, the bushing may be provided with a wear resisting insert 124 to increase the working life thereof. With this structure, it is seen that the boring tool in its retracted position is supported at or substantially at its cutting edge, thus, any possibility of radial vibrations occurring is substantially reduced so that the initial cutting action of the boring tool is performed with a relatively high degree of accuracy. After the boring operation has once been accurately started, it has been found that the work piece provides sufficient support for the boring tool so that the remainder of the boring operation may also be performed with a relatively high degree of accuracy.

Figures 3, 4:
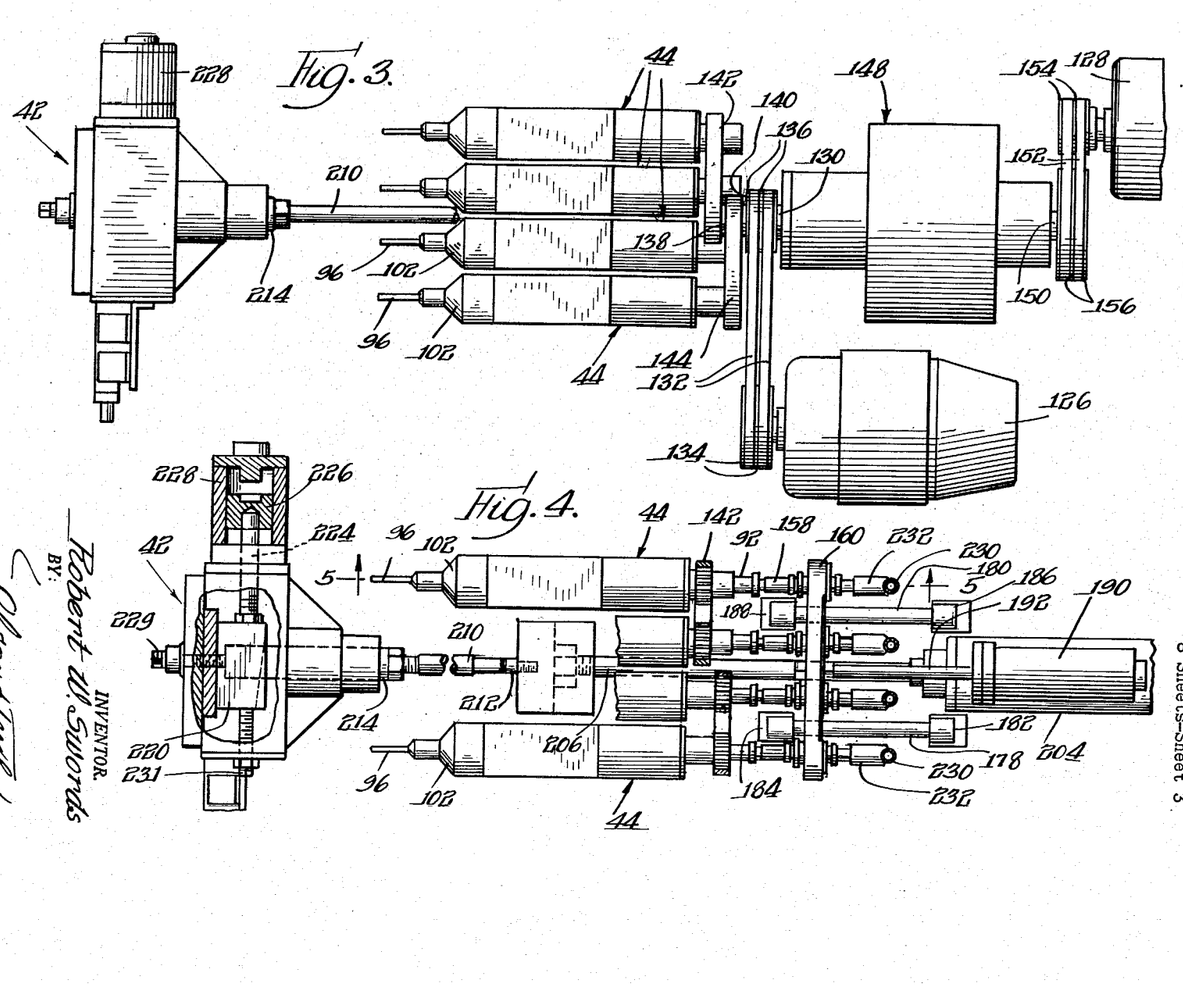
Fig. 3 is a somewhat diagrammatic plan view of the apparatus of this invention.
Fig. 4 is a fragmentary cross-sectional view taken along line 4—4 in Fig. 1.

In order to to obtain the most efficient cutting speeds for the boring and facing tools, means is provided for driving the hollow shafts 50 and 92 at a relatively high speed when the boring tool is functioning and at a relatively low speed when the facing tool is functioning. This means includes a high speed electric motor 126 and a low speed electric motor 128 suitably supported on the saddle or carriage 34. The high speed motor is operatively connected to a drive shaft 130 by means of a pair of V-belts 132 wrapped around pulleys 134 on the motor shaft and pulleys 136 on the drive shaft. As shown best in Figs. 1, 2 and 3, the drive shaft 130 also has secured thereto a pair of pulleys 138 and 140. Cog or timing belts 142 and 144 are respectively wrapped around the pulleys 138 and 140 for driving the spindle heads 44. In the particular form of the apparatus illustrated, each of the belts drives two of the spindle heads. Since the belts 142 and 144 must be axially spaced from one another, the pulleys 86 of the spindle heads driven by the belt 142 must be axially spaced from the pulleys driven by the belt 144. In order to accomplish this result while still making all of the parts of each spindle head identical to each other for most economical manufacture and maintenance, the hollow shafts 50 and 92 are all made the same length and the pulleys 86 are provided with either separate or integral spacing sleeves 146. Thus, with the pulley 86 positioned for cooperation with the belt 142, as shown in Fig. 5, it is merely necessary to turn the pulley around to position it for cooperation with the belt 144.

The drive shaft 130 is connected to the output side of a clutch mechanism 148. An input shaft 150 of the clutch mechanism is driven from the low speed motor 128 by means of V-belts 152 and pulleys 154 and 156. The clutch mechanism may be of any suitable well-known type with a magnetic clutch being preferred. This structure enables the low speed motor to be disengaged from the drive shaft when the high speed motor is operating, whereby the power requirement for the high speed motor is substantially reduced. It will be observed that the high speed motor is continuously connected to the drive shaft and will be driven when the low speed motor is functioning. However, the extra power required for the low speed motor for driving the high speed motor is relatively small and, therefore, the illustrated apparatus is highly satisfactory and at the same time it is relatively simple in construction.

In order to reciprocate the boring tool 96 relative to the facing tool 98, the shaft 92 threadedly receives an end of a shaft 158, as shown in Figs. 1, 4, 6 and 9. The shaft 158 extends through and is rotatably mounted in a crosshead or yoke 160. As shown best in Fig. 6, the shaft 158 carries a sleeve 162 which is held in position by a pair of collars 164 and 166. These collars may be adjusted along the shaft 158 to change the relative positions of the shaft and crosshead, whereby to adjust the shaft and boring tool to compensate for changes in the length of the boring tool resulting from sharpening. Suitable ball bearing assemblies 168 and 170 are disposed between the sleeve and the bushing member 172 mounted on the crosshead 160. The sleeve 162, and thus the shaft 158, is restrained against axial movement relative to the crosshead by means of a ring 174 secured to the bushing 172 and a collar 176 secured to the sleeve. The crosshead 160 is slidably mounted on a pair of guide rods 178 and 180, which rods are respectively mounted by bracket members 182—184 and 186—188 on the saddle or carriage 34. A hydraulic motor 190, having a piston rod 192 extending therefrom and connected to the crosshead, is provided for reciprocating the crosshead and, thus, the boring tool. As shown best in Fig. 4, each of the several spindle heads 44 has its boring tool operatively connected to the crosshead 160 so that all of the boring tools are operated in unison.

Figure 11:
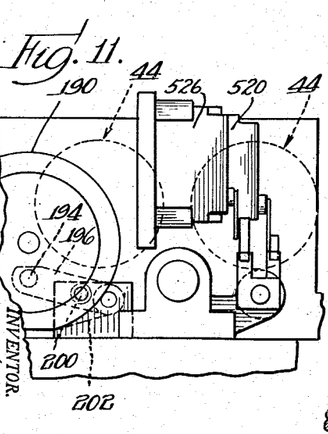
Fig. 11 is an elevational view taken along line 11—11 in Fig. 9.
Figures 13, 14, 15, 16:
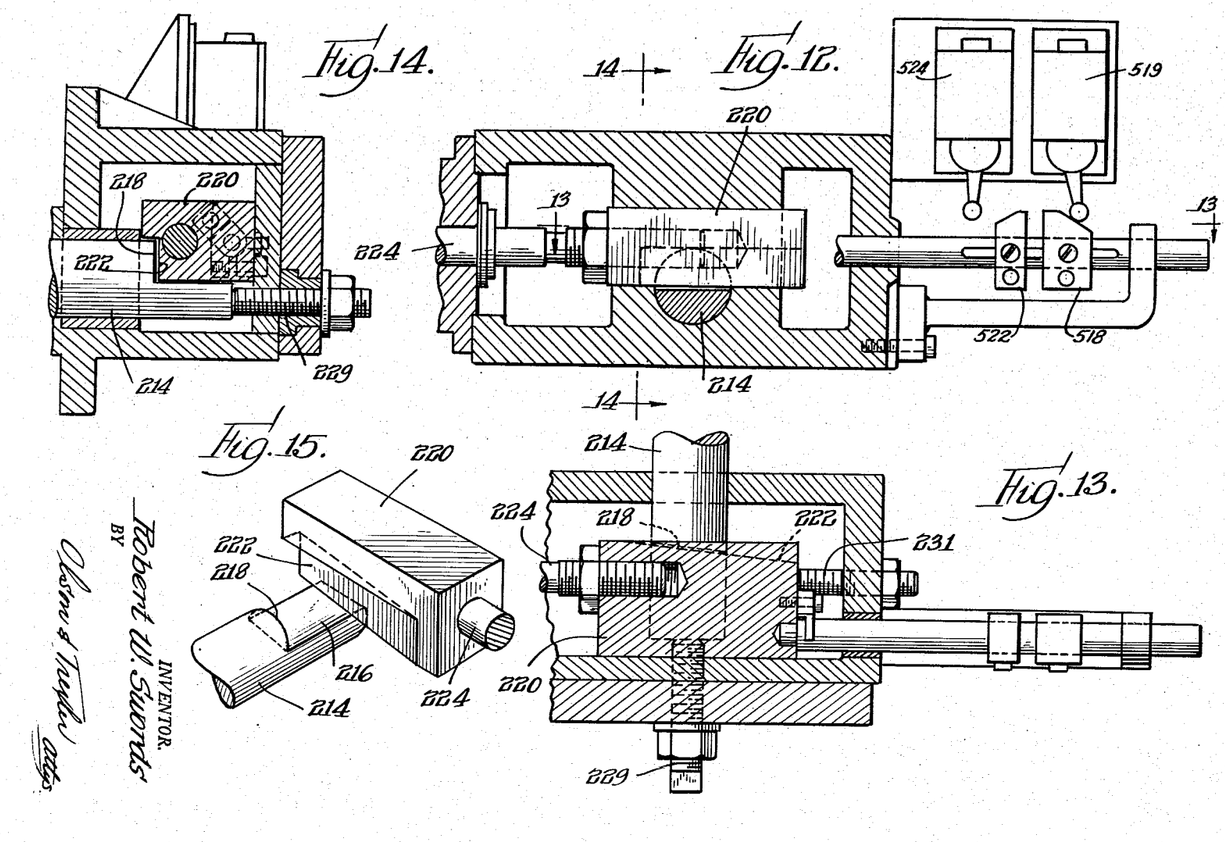
Fig. 13 is a fragmentary cross-sectional view taken along line 13—13 in Fig. 12.
Fig. 14 is a cross-sectional view taken along line 14—14 in Fig. 12.
Fig. 15 is a fragmentary perspective view illustrating the wedge and adjustable stop member of Figs. 12 through 14.
Fig. 16 is a fragmentary elevational view partially broken away to illustrate a modified form of a novel spindle head of this invention.
Figures 16, 17, 18, 19, 20:
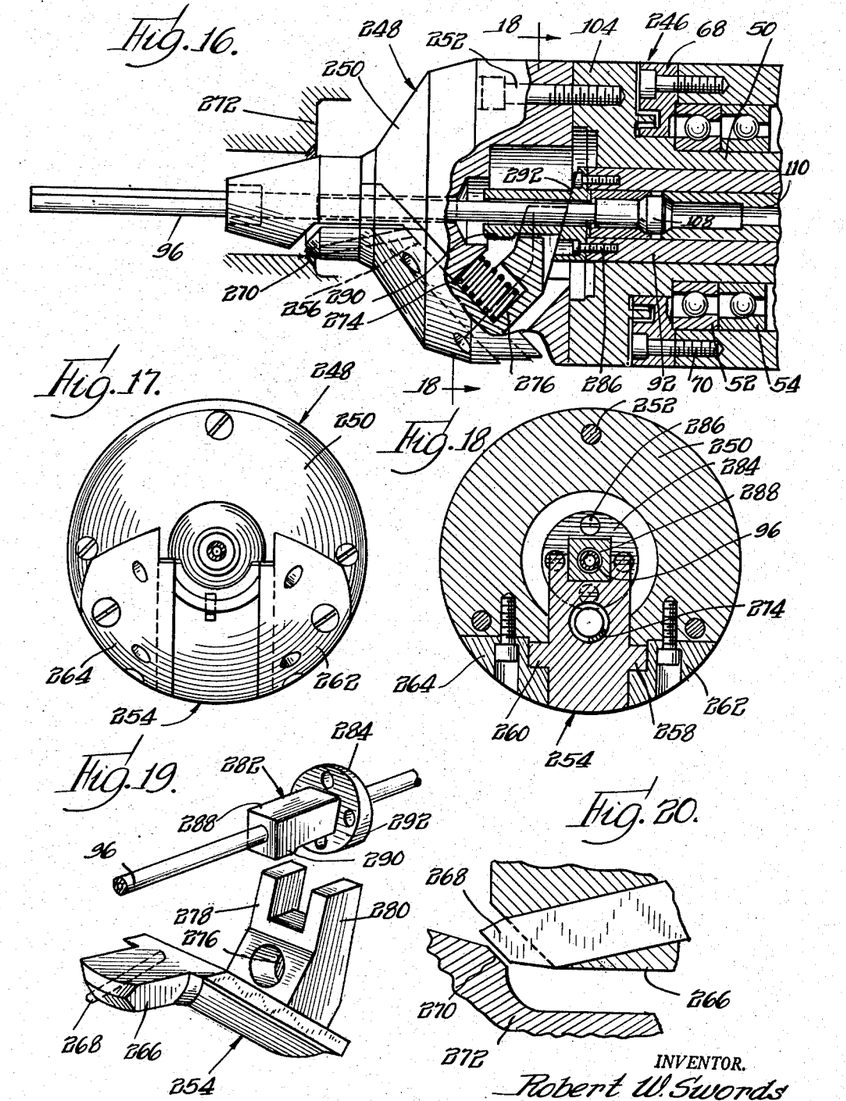
Fig. 17 is an end view of the spindle head shown in Fig. 16.
Fig. 18 is a cross-sectional view taken along line 18—18 in Fig. 16.
Fig. 19 is an exploded perspective view illustrating certain elements of the spindle head shown in Fig. 16.
Fig. 20 is an enlarged fragmentary view illustrating the facing tool of a spindle head shown in Fig. 16.

Rearward movement of the crosshead 160 may be limited by an adjustable stop member 194 mounted in the arm 196. The arm 196 is pivoted to a bracket 198 secured to the saddle or carriage and held in the upper operative position illustrated in Fig. 11 by locking pin 200. However, the lever 196 may be dropped downwardly out of the operative position and against an inclined surface 202 of the bracket 198 whenever it is desired to retract the head past the stop for assembly or disassembly of the apparatus, or any other desired purpose.

The saddle or carriage 34 is actuated to and from extended and retracted positions by means of a hydraulic cylinder 204 on the base 32 and having a piston rod 206 extending therefrom and connected to a lug 208 depending from the carriage. In order to locate the forward operative position of the saddle and spindle heads carried thereby, the stop means 42 is provided with a pin or rod 210 which extends for engagement with a pin 212 on the lug 208. As will appear from the description of the operation set forth hereinbelow, the rod 210 is adapted to be shifted back and forth to change the forward position of the spindles. In order to accomplish this result, the mechanism shown best in Figs. 3, 4, 12, 13, 14 and 15 is provided. This mechanism includes a slidably mounted bar 214 to whihc the rod 210 is operatively and rigidly connected. The end of the bar 214 is recessed as at 216, with a generally radially extending surface 218 inclined relative to the axis of the bar, as shown best in Fig. 13. A wedge block 220 is slidably mounted for movement transversely of the bar 214 and is recessed to provide an inclined cam surface 222 cooperable with the surface 218 for shifting the bar 214 and the rod 210 axially. The wedge block is connected to and operated by a piston rod 224 of a piston 226 operable within a hydraulic cylinder 228. With the arrangement illustrated, the wedge block operates to extend the rod 210 when the piston rod 224 is extended, and when the wedge block is retracted, the rod 210 is returned to its retracted position by the force supplied by the saddle or carriage actuating cylinder. An adjustable screw 229 is threaded into the housing of the stop means 42 for engaging the end of the bar 214 and limiting rearward movement thereof. Another screw 231 is provided for limiting the forward stroke of the wedge block 220 and, thus, the forward position of the stop rod 210.

When the boring tool 96 is functioning, it is desirable to lubricate and cool the cutting edge thereof. In accordance with the present invention, this is accomplished by directing a suitable liquid coolant through the spindle head and boring tool and discharging the coolant adjacent the cutting edge of the boring tool. Thus, the coolant may be supplied from any suitable source, not shown, to conduit means 230 which is connected to the rotatable shaft 158 by means of a coupling or union 232. The coupling or union, which is of course fixed against rotation, may be of any suitable well-known design capable of connecting a fixed conduit with a rotatable conduit. The shaft 158 is provided with a central bore 234 for directing the liquid coolant to a conduit 236 disposed within the shaft 92. The conduit communicates with a bore 238 extending through the chuck member, which bore in turn communicates with a passageway 240 extending through the boring tool 96. As shown best in Figs. 5 and 8, the passageway 240 opens at the end of the boring tool adjacent the cutting edge so that the coolant is effectively directed to the cutting edge.

Figure 21:
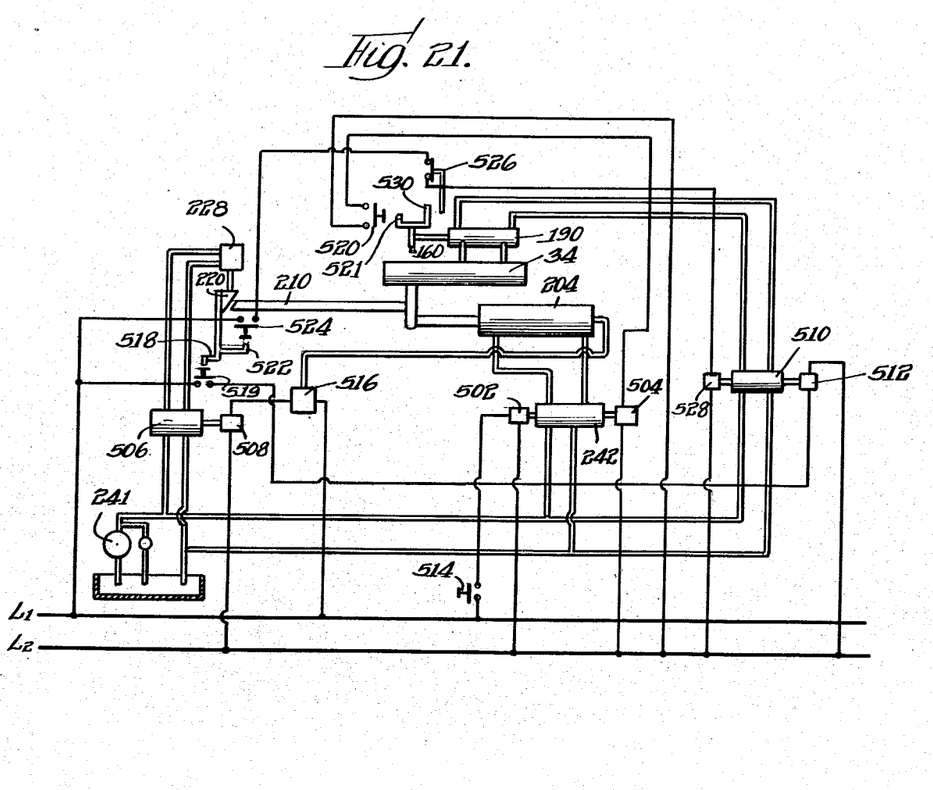
Fig. 21 is a schematic layout of a control circuit for the apparatus.

The operation of the apparatus will now be described and the necessary hydraulic and electrical circuits are shown in simplified form in Fig. 21. These circuits include a motor driven pump 241 connected with a control valve 242 associated with the cylinder 204. The valve 242 is adapted to be shifted in opposite directions to rapid advance and rapid return positions by solenoids 502 and 504. Mechanical means which need not be described is also used for shifting the valve 242 from the rapid advance position to a feed position. A valve 506 is associated with the cylinder 228 for controlling operation of the wedge 220. The valve 506 is spring biased so that fluid is normally directed to the cylinder 228 in a manner which retains the wedge 220 in a retracted position. A solenoid 508 is associated with the valve 506 for shifting the valve so as to cause fluid to be directed to the cylinder 228 for advancing the wedge 220.

Another valve 510 is associated with the cylinder 190 which controls a portion of the yoke 160 and thus the boring tools. The valve 510 is normally spring biased to a central neutral position. A solenoid 512 is provided for shifting the valve 510 so as to cause the yoke 160 and thus the boring tools to be advanced. Another solenoid 528 is provided for shifting the valve 510 so as to cause the boring tools to be retracted. Before starting an operating cycle of the apparatus, the saddle or carriage 34 is, of course, retracted from the forward operative position illustrated to permit a work piece to be mounted in the fixture. In addition, the crosshead 160 is retracted to withdraw the boring tools toward their retracted positions and, in the preferred manner of operation, the wedge block 220 is also retracted. After the work piece has been properly positioned and clamped in any suitable manner, a start switch 514 is pressed so as to energize the solenoid 502 to cause fluid to be directed to the cylinder 204 for rapidly advancing the carriage 34. As indicated above, means is preferably provided for subsequently shifting the valve 242 after the carriage has advanced to a predetermined position so as to cause the carriage to be further advanced relatively slowly to bring the cutting tools 98 into engagement with a valve seat 243 on a workpiece or cylinder head 38. As the carriage begins its relatively slow feeding movement, the low speed motor 128 and the magnetic clutch 148 are energized by suitable means, not shown, to rotate the cutting tools 98. With the arrangement of a plurality of cutting tools 98, shown best in Fig. 7, the valve seat may be finished by a facing operation. Further advancement of the carriage is prevented by engagement of the carriage with the stop rod 210, and as a result fluid pressure builds up within the cylinder 204. When this occurs, a pressure switch 516 is actuated so as to cause the solenoid 508 to be energized for shifting the valve 506 to direct fluid to the cylinder 228 for causing advancement of the wedge 220. This action causes the rod 210 to advance and to push the carriage rearwardly in order to disengage the cutting tools 98 from the valve seat. In addition, suitable control means, not shown, are actuated for de-energizing the low speed motor and the magnetic clutch and for energizing the high speed motor 126. Upon completion of the forward movement of the wedge, a dog 518 (see Figs. 12 and 21) movable therewith actuates a switch 519 so as to energize the solenoid 512. The causes fluid to be directed to the cylinder 190 so as to advance the cross head or yoke 160 and the boring tools. Since the boring tools are radially supported against whipping action substantially at their cutting edges as they enter the valve stem guide apertures 244 in the work piece, these apertures are formed substantially concentric with their respective valve seats. It has been found that the valve stem guides and valve seats when finished by the apparatus of the present invention are more nearly concentric (and sometimes they are actually concentric) than it has ever been possible to make them before by using prior machines. It is, of course, understood that as the boring tools are advanced, suitable means, not shown, is actuated to direct a liquid coolant through the spindle heads and boring tools in the manner set forth above. After the boring operation has been completed, a switch 520 is engaged and closes by a dog 521 movable with the yoke 160 (see Figs. 9 and 21). This closes a circuit which energizes the solenoid 504 whereby to cause the valve 242 to be shifted to a position for directing fluid to the cylinder 204 in a manner which retracts the slide 34. When this occurs, the fluid pressure applied to the pressure switch 516 is relieved so that this switch is opened and the solenoid 508 is deenergized. The spring biased valve 506 then directs fluid to the cylinder 228 so as to cause the wedge 220 to be retracted. When the wedge 220 reaches its retracted position, the dog 522 movable with the wedge actuates and closes a switch 524. This competes a circuit which includes a normally closed switch 526 for energizing a solenoid 528 associated with the valve 510. When this occurs the valve 510 is shifted so as to cause the cylinder 190 to retract the yoke 160 and the boring tools. Another dog 530 movable with the yoke 160 engages and opens the switch 526 when the yoke has been fully retracted so as to deenergize the solenoid 528 and permit the spring biased valve 510 to shift to a neutral position.

In Figs. 16 through 20, there is illustrated a spindle head structure 246 which embodies a slightly modified form of the present invention. With the exception of the head structure of the spindle 246, it is substantially identical to the above described spindle head 44, as indicated by the application of identical reference numerals to identical parts. In this embodiment, a head structure 248 has replaced the above described head 102 and the head structure 248 includes a main portion 250 which is secured to the flange end of the rotatable shaft 50 by screws 252. The head portion 250 is recessed to accommodate a slide member 254 which is adapted to slide along a surface 256 of the main head portion to and from extended and retracted positions. The slide member is provided with a pair of oppositely extending flanges 258 and 260 and is retained in position by a pair of guide blocks 262 and 264 which overlie the flanges and are secured to the main head portion by suitable screws. The slide member 254 includes a finger portion 266 which carries a single cutting or facing tool 268. With this structure, it is seen that the tool 268 may be moved both axially and radially of the spindle head to generate a valve seat 270 on a work piece 272. The work piece 272, like the work piece 38, may be an engine cylinder head and it is understood that the illustrated portions of the work pieces 38 and 272 merely show work pieces or cylinder heads of different shapes.

The slide member 254 is normally retained in a rearward retracted position by means of a compression spring 274 which acts between the head portion 250 and a seat 276 formed in the slide member. In order to move the slide member from the retracted position to the advanced position illustrated in Fig. 16, a pair of arm portions 278 and 280 extend inwardly from the outer end of the slide member. In this embodiment, the above described cap 114 of the spindle head 44 has been replaced by a member 282 having a cap portion 284 secured to the hollow shaft 92 by screws 286, and an integral shank portion 288. The shank 288 extends between the legs 278 and 280 of the slide member and a lug 290 extends from the shank and behind the inwardly extending portion of the slide member for the purpose set forth hereinbelow. It should be noted that the cap portion is provided with a cam surface 292 for engaging the legs 278 and 280, which cam surface and legs are inclined relative to the axis of the spindle head. With this structure, the cap portion 284 engages the arms of the slide member when the shaft 92 and the boring tool are advanced from their retracted positions and moves the slide member and the cutting tool 268 carried thereby generally axially and radially of the spindle head to finish the valve seat 270. Preferably, the cap portion 284 and the slide member arms are formed so that the facing tool 268 will be advanced to finish the valve seat only after the boring tool has been advanced and the boring operation is completed. Upon the subsequent withdrawal or retraction of the boring tool, the lug 290 positively starts the slide member toward its retracted position, thereby eliminating any possibility of the slide member sticking in its advanced position. It is understood that the spindle head 246 may be substituted in the above described apparatus 30 for the spindle heads 44. The remainder of the apparatus will remain substantially the same except the adjustable stop means 42 may be eliminated and the automatic control means, not shown, may be adjusted to operate the apparatus in the following manner. As before, the carriage is first advanced at a relatively rapid rate to bring the spindle heads to a predetermined position adjacent a work piece supported in the fixture. Then, instead of energizing the low speed motor and feeding the carriage to finish the valve seats, the boring tools of the spindle heads 246 are advanced and the high speed motor is energized. At the completion of the boring operation, the high speed motor is de-energized while the low speed motor and the magnetic clutch are energized. The boring tool is then advanced a further amount and, as set forth above, this action causes the cap portion 284 to move the slide member 254 and feed the cutting tool across the valve seat. After the valve seat has been finished, the carriage 34 is retracted while the facing tool 268 is still extended so that the facing tool is withdrawn from the work piece in a manner to entirely eliminate any possibility of scratching the valve seat. After the facing operation is completed and preferably before the carriage is withdrawn, the low speed motor is, of course, de-energized.

From the above description, it is seen that the present invention has provided a novel apparatus for rapidly and economically forming a bore and a surrounding surface in a work piece such as a cylinder head with the bore and the surroundng surface being more nearly concentric than it has ever been possible to make them with prior machinery. Furthermore, it is seen that the present invention has provided a novel apparatus which is relatively simple and economical to manufacture and maintain and which is rugged so as to have a long working life. In addition, with the apparatus of this invention, it is seen that the work piece may be efficiently and economically finished by operating the different cutting tools at different speeds to obtain a most efficient cutting action. It is understood that even though the present invention has been described with particular reference to finishing valve stem guides and valve seats, apparatus embodying the principles of the invention might be used for other purposes such as initially drilling the hole or bore and rough forming the valve seat. When the rough machining is to be accomplished a drilling tool will, of course, be substituted for the boring tool.

While the preferred embodiments of the present invention have been shown and described herein, it is obvious that many structural details may be changed wtihout departing from the spirit and scope of the appended claims.

The invention is claimed as follows:

1. An apparatus for machining a bore in a work piece and for machining a surface of the work piece surrounding said bore, comprising a spindle head, said spindle head including rotatable means, a tool disposed on said rotatable means for machining said surface surrounding said bore in the work piece, an elongated bore machining tool concentrically and reciprocably disposed within said rotatable means, and means on said rotatable means for radially supporting said bore machining tool adjacent a cutting edge thereof for restraining whipping action by said bore machining tool at said cutting edge when the bore machining tool is in a retracted position, means for reciprocating said bore machining tool relatve to said first mentioned tool, means for advancing and withdrawing said spindle head to and from operative and inoperative positions, means for rotating said rotatable means and said bore machining tool, and means for causing successive working engagement of said tools with the work piece and for automatically causing one tool to have an axial idle movement relative to the work piece at the completion of its working operation and substantially prior to initiation of the working operation of the other tool, said last means including mechanism for preventing substantial simultaneous working engagement of the tools with the work piece whereby said other tool is in working engagement with the work piece only after said one tool has substantially completed its operation on the work piece and has begun its idle axial movement.

2. An apparatus for machining a bore in a work piece and for machining a surface of the work piece surrounding said bore, comprising a rotatably mounted tool for machining said surface surrounding said bore in the work piece, an elongated bore machining tool concentric with the axis of rotation of said first mentioned tool and mounted for reciprocable movement relative to said first mentioned tool, means for radially supporting said bore machining tool adjacent a cutting edge thereof for restraining whipping action by said bore machining tool at said cutting edge when the bore machining tool is in a retracted position, means for reciprocating said bore machining tool relative to said first mentioned tool, means for rotating said bore machining tool at a relatively high speed, means for rotating said first mentioned tool at a relatively low speed, and means for causing successive working engagement of said tools with the work piece and for automatically causing one tool to have an axial idle movement relative to the work piece at the completion of its working operation and substantially prior to initiation of the working operation of the other tool, said last means including mechanism for preventing substantial simultaneous working engagement of the tools with the work piece whereby said other tool is in working engagement with the work piece only after said one tool has substantially completed its operation on the work piece and has begun its idle axial movement.

3. An apparatus for machining a bore in a work piece and for machining a surface of the work piece surrounding said bore, comprising a rotatably mounted tool for machining said surface surrounding the bore of the work piece, an elongated bore machining tool concentric with the axis of rotation of said first mentioned tool and reciprocable relative to said first mentioned tool, means for radially supporting said bore machining tool adjacent a cutting edge thereof for restraining whipping action by said bore machining tool at said cutting edge when the bore machining tool is in a retracted position, means interconnecting said first mentioned tool and said bore machining tool for rotation in unison substantially throughout the work piece engaging operation of each tool, means for rotating said tools at a relatively high speed while the bore machining tool is cutting the work piece, and means for rotating said tools at a relatively low speed while said first mentioned tool is machining the work piece, and means for causing successive working engagement of said tools with the work piece and for automatically causing one tool to have an axial idle movement relative to the work piece at the completion of its working operation and substantially prior to initiation of the working operation of the other tool, said last means including mechanism for preventing substantial simultaneous working engagement of the tools with the work piece whereby said other tool is in working engagement with the work piece only after said one tool has substantially completed its operation on the work piece and has begun its idle axial movement.

4. An apparatus for machining a bore in a work piece and for machining a surface of the work piece surrounding said bore, comprising a rotatably mounted tool for machining said surface surrounding said bore of the work piece, an elongated bore machining tool concentric with the axis of rotation of said rotatable tool and reciprocable relative to said rotatable tool, means for radially supporting said bore machining tool adjacent a cutting edge thereof for restraining whipping action by said bore machining tool at said cutting edge when said bore machining tool is in a retracted position, means interconnecting said rotatable tool and said bore machining tool for rotation in unison substantially throughout the work piece engaging operation of each tool, a relatively high speed motor operatively connected with said tools for driving said tools while the bore machining tool is machining the work piece, and a relatively low speed motor operatively connected with said tools for driving said tools while said rotatable tool is machining the work piece, and means for causing successive working engagement of said tools with the work piece and for automatically causing one tool to have an axial idle movement relative to the work piece at the completion of its working operation and substantially prior to initiation of the working operation of the other tool, said last means including mechanism for preventing substantial simultaneous working engagement of the tools with the work piece whereby said other tool is in working engagement with the work piece only after said one tool has substantially completed its operation on the work piece and has begun its idle axial movement.

5. An apparatus for machining a bore in a work piece and for machining a surface of the work piece surrounding said bore, comprising a spindle head, said spindle head including rotatable means, a tool mounted on said rotatable means for machining said surface surrounding said bore of the work piece, an elongated bore machining tool concentrically and reciprocably disposed within said rotatable means, and means on said rotatable means for radially supporting said bore machining tool adjacent a cutting edge thereof for restraining whipping action by said bore machining tool at said cutting edge when the bore machining tool is in a retracted position, means for reciprocating said bore machining tool relative to said rotatable means, means for advancing and withdrawing said spindle head to and from operative and inoperative positions, means interconnecting said bore machining tool and said rotatable means for rotation in unison substantially throughout the workpiece engaging operation of each tool, a drive member operatively connected to said rotatable means for driving said rotatable means and said tools, relatively high speed motor means for driving said drive member, relatively low speed motor means for driving said drive member, and means for selectively operatively connecting and disconnecting said low speed motor means from said drive member, and means for causing successive working engagement of said tools with the work piece and for automatically causing one tool to have an axial idle movement relative to the work piece at the completion of its working operation and substantially prior to initiation of the working operation of the other tool, said last means including mechanism for preventing substantial simultaneous working engagement of the tools with the work piece whereby said other tool is in working engagement with the work piece only after said one tool has substantially completed its operation on the work piece and has begun its idle axial movement.

6. An apparatus for machining a bore in a work piece and for machining a surface of the work piece surrounding said bore, comprising rotatable means, a tool mounted on said rotatable means for machining said surface surrounding said bore in the work piece, a bore machining tool concentrically and reciprocably disposed with said rotatable means, means for advancing said rotatable means and said tools to an initial operative position wherein one of said tools engages the work piece, means for subsequently advancing the other of said tools into operative engagement with the work piece, and means operable in response to advance of one of said tools for maintaining said first mentioned tool out of engagement with the work piece while said other tool is machining the work piece.

7. An apparatus, as defined in claim 6, wherein said last named means includes adjustable stop means for positioning said rotatable means and said first mentioned tool carried thereby relative to the work piece.

8. An apparatus, as defined in claim 6, wherein said last named means includes means adjustably mounting said first mentioned tool on said rotatable means and operable to advance and retract said first mentioned tool relative to said rotatable means.

9. An apparatus for machining a bore in a work piece and for machining a surface of the work piece surrounding said bore, comprising a spindle head having rotatable means carrying a tool for machining said surface and an elongated bore machining tool concentrically and reciprocably disposed within said rotatable means for machining said bore, means for advancing and withdrawing said spindle head to and from operative and inoperative positions, shiftable stop means movable to and from a position for selectively locating said spindle head with said first mentioned tool at a predetermined advanced position spaced from said work piece surface, means for reciprocating said bore machining tool relative to said rotatable means, and means for shifting said stop means out of said spindle head locating position so that the spindle head may be advanced with said first mentioned tool engaging said surface and for shifting said stop means into said spindle locating position to locate said spindle head with said first mentioned tool out of contact with said surface.

10. An apparatus, as defined in claim 9, wherein said stop shifting means comprises reciprocable wedge means engageable with said stop means, and means for actuating said wedge means and said bore machining tool reciprocating means in timed relationship.

11. In an apparatus for finishing a valve stem guide and a valve seat on a work piece, a spindle head comprising rotatable means, a facing tool mounted on said rotatable means, an elongated bore machining tool concentrically and reciprocably mounted within said rotatable means for movement to and from extended and retracted positions, said rotatable means including means for radially supporting said bore machining tool adjacent a cutting edge thereof for restraining whipping action by said bore machining tool at said cutting edge while said bore machining tool is in said retracted position, and means for causing successive working engagement of said tools with the work piece and for automatically causing one tool to have an axial idle movement relative to the work piece at the completion of its working operation and substantially prior to initiation of the working operation of the other tool, said last means including mechanism for preventing substantial simultaneous working engagement of the tools with the work piece whereby said other tool is in working engagement with the work piece only after said one tool has substantially completed its operation on the work piece and has begun its idle axial movement.

12. An apparatus for machining a bore in a work piece and for machining a surface surrounding said bore comprising rotatable means, a tool for machining said surface, means mounting said tool on said rotatable means for movement generally axially of said rotatable means, an elongated bore machining tool concentrically and reciprocably mounted within said rotatable means for movement to and from extended and retracted positions, means on said rotatable means for radially supporting said bore machining tool adjacent a cutting edge thereof for restraining whipping action by said bore machining tool at said cutting edge when the bore machining tool is in said retracted position, means operable by said bore machining tool upon movement toward said extended position for advancing said first mentioned tool relative to said rotatable means, and means for causing successive working engagement of said tools with the work piece and for automatically causing one tool to have an axial idle movement relative to the work piece at the completion of its working operation and substantially prior to initiation of the working operation of the other tool whereby said other tool is in working engagement with the work piece only after said one tool has substantially completed its working operation on the work piece.

13. An apparatus for forming a bore in a work piece and for machining a surface surrounding said bore comprising a rotatably mounted tool for machining said surface, an elongated tool for machining said bore, means mounting said elongated tool for rotation about an axis concentric with the axis of rotation of said first mentioned tool and mounting said elongated tool for reciprocating movement to and from extended and retracted positions, means for radially supporting said elongated tool adjacent the forward end thereof for restraining said forward end against whipping action when said elongated tool is in said retracted position, and means for causing successive working engagement of said tools with the work piece and for automatically causing one tool to have an axial idle movement relative to the work piece at the completion of its working operation and substantially prior to initiation of the working operation of the other tool, said last means including mechanism for preventing substantial simultaneous working engagement of the tools with the work piece whereby said other tool is in working engagement with the work piece only after said one tool has substantially completed its operation on the work piece and has begun its idle axial movement.

14. An apparatus for machining a bore in a work piece and for machining a surface surrounding said bore comprising rotatable means, a tool mounted on said rotatable means for machining said surface, an elongated tool concentrically and reciprocably disposed within said rotatable means for machining said bore, means for radially supporting said elongated tool adjacent the forward end thereof for restraining said forward end against whipping action when said forward end initially engages the work piece, and means for causing successive working engagement of said tools with the work piece and for automatically causing one tool to have an axial idle movement relative to the work piece at the completion of its working operation and substantially prior to initiation of the working operation of the other tool, said last means including mechanism for preventing substantial simultaneous working engagement of the tools with the work piece whereby said other tool is in working engagement with the work piece only after said one tool has substantially completed its operation on the work piece and has begun its idle axial movement.

15. An apparatus, as defined in claim 14, wherein the rotatable means includes concentric inner and outer spindle means carrying, respectively, said elongated tool and said surface machining tool means, and wherein the means radially supporting the elongated tool against whipping action comprises mounting means disposed in advance of the adjacent forward end of said inner spindle means end in direct engagement with the elongated tool for rotatably supporting the forward end thereof in retracted position to restrain the said forward end against whipping action upon initial engagement thereof with the work piece.

References Cited in the file of this patent

UNITED STATES PATENTS

| | | |
|---|---|---|
| 511,872 | Bidwell | Jan. 2, 1894 |
| 1,022,051 | Shanks | Apr. 2, 1912 |
| 1,940,220 | McGrath | Dec. 19, 1933 |
| 2,027,385 | Kraut | Jan. 14, 1936 |
| 2,102,707 | Holhut | Dec. 21, 1937 |
| 2,131,845 | Nutt | Oct. 4, 1938 |
| 2,345,403 | McGrew | Mar. 28, 1944 |

OTHER REFERENCES

Myers: Abstract No. 144,273; Sept. 8, 1953; 674 O.G. 529.